(12) United States Patent
Schumann et al.

(10) Patent No.: US 9,453,576 B2
(45) Date of Patent: Sep. 27, 2016

(54) ACTUATING DEVICE AND TRANSMISSION

(71) Applicant: Schaeffler Technologies AG & Co. KG, Herzogenaurach (DE)

(72) Inventors: Lars Schumann, Buehl (DE); László Mán, Ottersweier-Unzhurst (DE); Peter Greb, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/430,495

(22) PCT Filed: Oct. 17, 2013

(86) PCT No.: PCT/DE2013/200231
§ 371 (c)(1),
(2) Date: Mar. 23, 2015

(87) PCT Pub. No.: WO2014/063698
PCT Pub. Date: May 1, 2014

(65) Prior Publication Data
US 2015/0240942 A1   Aug. 27, 2015

(30) Foreign Application Priority Data

Oct. 24, 2012   (DE) .................. 10 2012 219 372

(51) Int. Cl.
| | |
|---|---|
| *F16H 63/18* | (2006.01) |
| *F16H 61/688* | (2006.01) |
| *F16H 63/02* | (2006.01) |
| *F16H 63/30* | (2006.01) |

(52) U.S. Cl.
CPC ............ *F16H 63/18* (2013.01); *F16H 61/688* (2013.01); *F16H 2063/025* (2013.01); *F16H 2063/3086* (2013.01); *Y10T 74/20177* (2015.01)

(58) Field of Classification Search
CPC .......................... F16H 63/18; F16H 2063/025
See application file for complete search history.

(56) References Cited

U.S. PATENT DOCUMENTS

| | | | |
|---|---|---|---|
| 6,439,362 B2 | 8/2002 | Reik et al. | |
| 6,880,420 B2 * | 4/2005 | Shen | ............... 74/335 |
| 7,363,834 B2 | 4/2008 | Kapp et al. | |
| 7,963,183 B2 * | 6/2011 | Pick et al. | ........ 74/337 |
| 8,596,152 B2 * | 12/2013 | Piacenza et al. | ......... 74/55 |
| 2013/0312562 A1 | 11/2013 | Prix et al. | |

FOREIGN PATENT DOCUMENTS

| | | |
|---|---|---|
| CN | 1918408 A | 2/2007 |
| DE | 3037990 A1 | 5/1982 |
| DE | 19509477 A1 | 9/1996 |
| DE | 19915522 A1 | 10/2000 |
| DE | 10354721 A1 | 11/2004 |

(Continued)

*Primary Examiner* — Terence Boes
(74) *Attorney, Agent, or Firm* — Simpson & Simpson, PLLC

(57) ABSTRACT

An actuation device especially for actuating a transmission for selecting a gear step and engaging and disengaging the selected gear step and/or for actuating at least one clutch. The actuation device includes at least one rotatable roll element that has guide tracks, into each of which a contact element of a selector fork engages to move the selector fork in order to select and engage or disengage a gear step of a transmission, and an actuation region for a clutch actuation means for actuating the at least one clutch.

12 Claims, 17 Drawing Sheets

(56) References Cited

FOREIGN PATENT DOCUMENTS

| DE | 102004041353 A1 | 3/2006 |
| DE | 19655083 B4 | 12/2010 |
| DE | 102010012134 A1 | 9/2011 |
| EP | 1333201 A2 | 8/2003 |
| EP | 1980772 A1 | 10/2008 |
| FR | 2925945 A1 | 7/2009 |
| WO | 97/02963 | 1/1997 |
| WO | 02/066870 A1 | 8/2002 |
| WO | 2012/110446 A1 | 8/2012 |

* cited by examiner

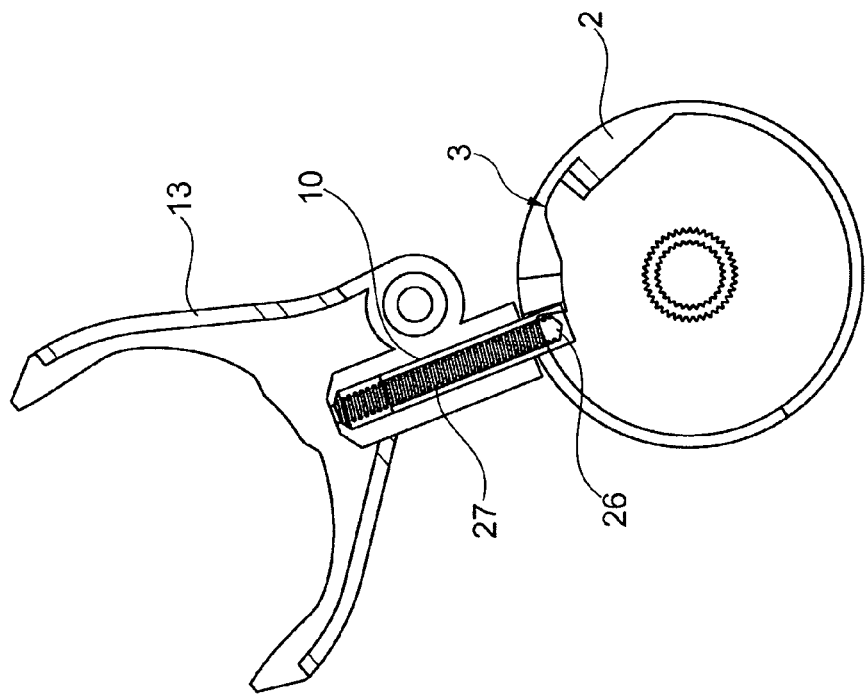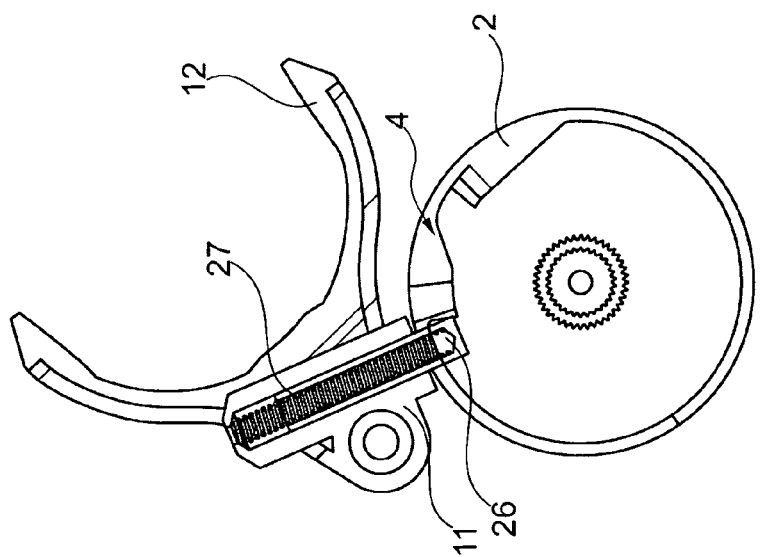
Fig. 14

ACTUATING DEVICE AND TRANSMISSION

CROSS-REFERENCE TO RELATED APPLICATIONS

The present application is the U.S. National Stage Application pursuant to 35 U.S.C. §371 of International Patent Application No. PCT/DE2013/200231, filed on Oct. 17, 2013, which application claims priority from German Patent Application No. DE 10 2012 219 372.3 filed on Oct. 24, 2012, which applications are incorporated by reference in their entireties.

TECHNICAL FIELD

The invention relates generally to an actuating device, in particular, for actuating a transmission, to select a transmission ratio and to engage or disengage the selected transmission ratio and/or to actuate a clutch. The invention further relates to a transmission that includes at least one such actuating device.

BACKGROUND

Various actuating devices for transmissions or clutches are known in the art.

For example, German Patent No. DE 196 55 083 B4 (Reik et al.) discloses an actuating device for a transmission including a control cylinder integrated into the clutch cover. The clutch operation actuator is a separate element.

PCT International Patent Application Publication No. WO 97/02963 (Reik et al.) discloses an actuating device for a transmission and clutch wherein the transmission and the clutch are actuated by means of actuators that are separate from each other. PCT International Patent Application Publication No. WO 02/066870 A1 (Norum et al.) discloses a transmission actuator wherein a transmission ratio is disengaged in an automated way when a different transmission ratio is engaged.

SUMMARY

According to aspects illustrated herein, there is provided an actuating device for actuating a transmission to select a transmission ratio and to engage or disengage the selected transmission ratio and to actuate at least one clutch, including at least one rotary cylinder element, guide tracks formed in the at least one rotary cylinder element, shift forks each having a contact element engaging in the respective guide tracks to displace the shift forks in order to select and engage or disengage the transmission ratio of the transmission and an actuating region for a clutch actuating means for actuating the at least one clutch.

In an example embodiment of the invention, an actuating device, in particular, for actuating a transmission, to select a transmission ratio and to engage or disengage the selected transmission ratio and/or to actuate at least one clutch comprises at least one rotatable cylinder element with guide tracks in which a respective contact element of a shift fork engages to displace the shift fork in order to select and engage or disengage a transmission ratio of a transmission and an actuating region for a clutch actuating means for actuating the at least one clutch. Thus, actuation of the transmission and of the clutch is advantageously integrated into the actuating device.

In an example embodiment, the at least one cylinder element may be rotatable in a first direction of rotation and in a second direction of rotation running counter to the first direction of rotation. Thus, the direction of rotation of the cylinder element may be specifically selected to actuate the transmission and/or clutch as a function of the direction of rotation.

In an example embodiment, the guide tracks may be disposed on the outer circumference of the at least one cylinder element.

In an example embodiment, the at least one cylinder element may be hollow and may have an actuating region provided on its inner circumference. This allows not only the outer contour to be used but also in a space-saving way the inner contour.

In an example embodiment, the guide tracks may have junctions and the respective branches may be passed through as a function of the direction of rotation. Accordingly, when a junction is being passed, the direction after the junction is dependent on the direction of rotation, providing a simple way of subdivision and deflection.

In an example embodiment, when a junction is being passed in a first direction of rotation, a change from one guide track to another guide track may occur. This may advantageously occur as a result of a deflection in the region of the junction.

In an example embodiment, when a junction is being passed in a second direction, there will advantageously be no change from one guide track to another guide track.

In an example embodiment, the actuating region may include ramp regions which cause the clutch actuating means to be blocked against the ramp region and entrained in the rotation upon a rotation of the actuating region in a first direction of rotation and to be rotated relative to the ramp region and not entrained in the rotation upon a rotation of the actuating region in a second direction of rotation.

In an example embodiment, a transmission including a plurality of transmission ratios and at least one clutch comprises at least one actuating device as described above.

In an example embodiment, two actuating devices may be provided to select a transmission ratio and to engage or disengage the selected transmission ratio and/or to actuate two clutches.

In an example embodiment, the transmission may be a double clutch transmission.

An object of the invention is to provide an actuating device and a transmission that are of simple construction and cost-efficient to manufacture.

These and other objects, advantages and features of the present invention will be better appreciated by those having ordinary skill in the art in view of the following detailed description of the invention in view of the drawings.

BRIEF DESCRIPTION OF THE DRAWINGS

The present invention will be explained below based on preferred exemplary embodiments with reference to the associated figures, in which:

FIG. 14 is a view of a section of a transmission of the invention;

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
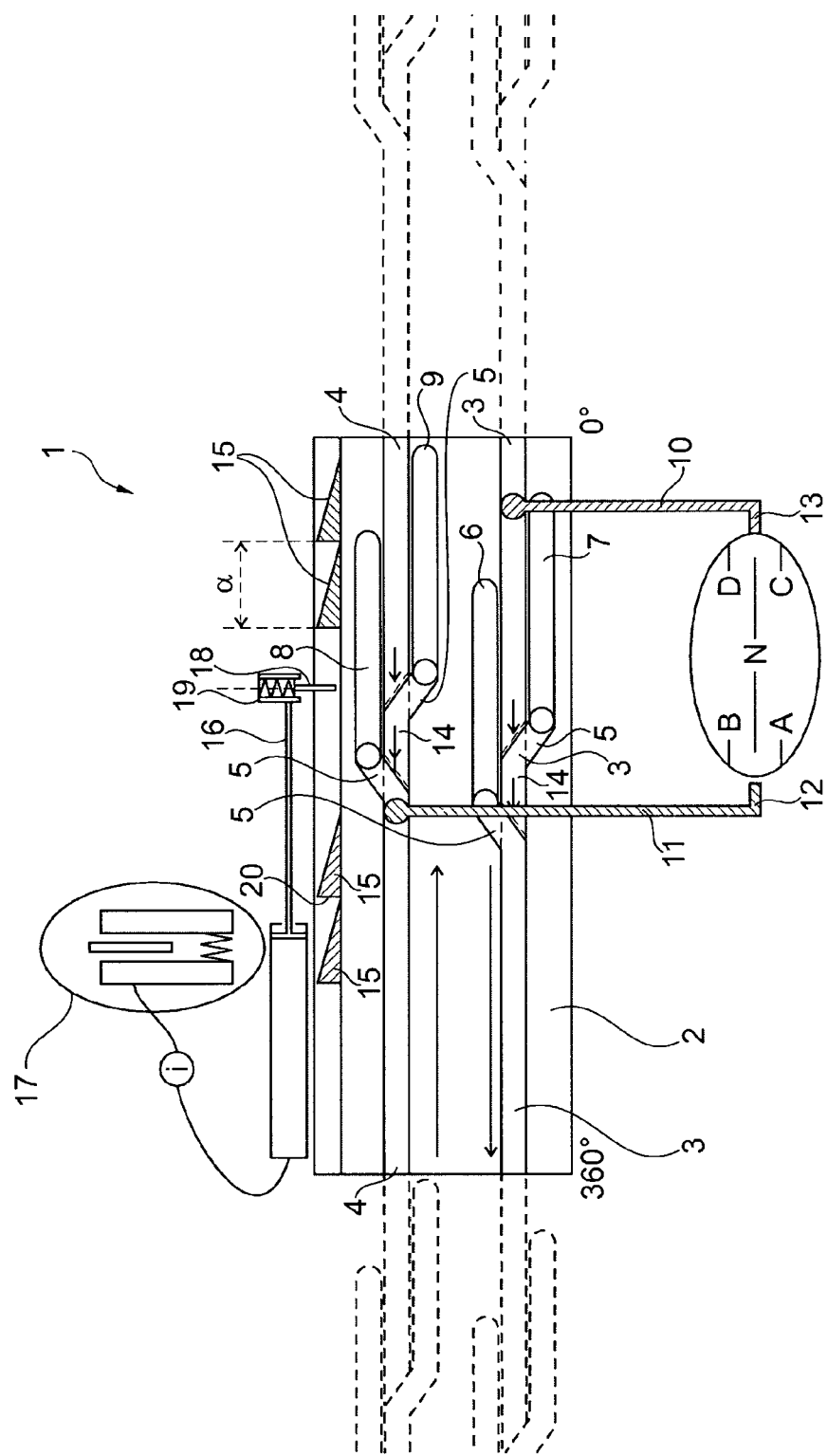
FIG. 1 is a diagrammatic representation of an example embodiment of an actuating device in a selected operating position.

FIG. 1 is a diagrammatic representation of actuating device 1, in particular, for actuating a transmission, in particular in a motor vehicle, for selecting and engaging/disengaging a transmission ratio and/or to actuate a clutch of the transmission. Actuating device 1 comprises rotatable cylinder element 2, which is diagrammatically represented as a rectangle in FIGS. 1 to 12. The rectangle diagrammatically indicates the unwound surface of cylinder element 2.

On its surface, rotatable cylinder element 2 has guide tracks 3, 4 extending in the circumferential direction of cylinder element 2 and having junctions 5. Thus, guide tracks 3, 4 include junctions 5 that divide guide tracks 3, 4 into guide tracks 6, 7, 8, 9. Guide tracks 6, 7 are disposed to be parallel with but axially offset from guide track 3 and guide tracks 8, 9 are disposed to be parallel with but axially offset from guide track 4. Guide tracks 6, 7, 8, 9 extend over only part of the length of guide tracks 3, 4 in the circumferential direction.

Contact elements 10, 11 of shift forks 12, 13 of the transmission engage in guide tracks 3, 4 to select and to engage or disengage a transmission ratio of the transmission by displacing shift forks 12, 13 in the axial direction of cylinder element 2. This allows transmission ratios A, B, C, D to be selected and engaged starting from neutral position N.

Actuation of contact elements 10, 11 and consequently of shift forks 12, 13 is achieved by rotating cylinder element 2 and shifting contact element 10, 11 engaged in guide tracks 3, 4 towards guide tacks 6, 7 and 8, 9, respectively, by axially displacing contact elements 10, 11 and thus, shift forks 12, 13. Actuation is attained by moving contact elements 10, 11 from guide tracks 3, 4 to guide tracks 6, 7 or 8, 9 by passing contact elements 10, 11 over junctions 5 towards guide tracks 6, 7, 8, 9. The transitions from guide tracks 3, 4 to guide tracks 6, 7, 8, 9 are dependent on the direction of rotation. Rotary cylinder element 2 is rotatable in a first direction of rotation and in a second direction of rotation counter to the first direction of rotation.

Transition of shift element 11 from guide track 4 to guide track 8 may be achieved by rotation in one direction of rotation whereas transition from guide track 8 to guide track 4 will then occur in the opposite direction of rotation. Transition from guide track 4 to guide track 9 occurs by rotating contact element 11 to the left into guide track 14 and subsequently by rotation in the opposite direction into guide track 9.

In the diagrammatic representation of FIG. 1, rotation to the left and to the right, respectively, means that the cylinder element as a rectangular surface is moved to the right or to the left. Transition from guide track 4, the right-hand portion, to region 14 through the one-way transition area occurs by displacing rotary cylinder element 2 to the right and subsequently, once contact element 11 has reached the region of guide track 14, displacing cylinder element 2 to the left. The same occurs when contact element 10 transitions from guide track 3 to guide track 6 or 7.

Junctions 5 indicated by a dashed line are passable in both direction, junctions 5 indicated by solid and dashed lines are one-way passages. An arrow indicates the passing direction from the passable side to the impassable side and a solid line, on its own, represents an impassable transition. A transition from one guide track to another guide track or guide track sections may occur in a corresponding way; if the transition is in the region of a passable junction, the transition may occur in both directions of rotation and if the transition is in the region of a one-way junction, the transition may only occur in one direction of rotation. The passing of a one-way junction in a direction against the passing direction is impossible.

Figure 10:
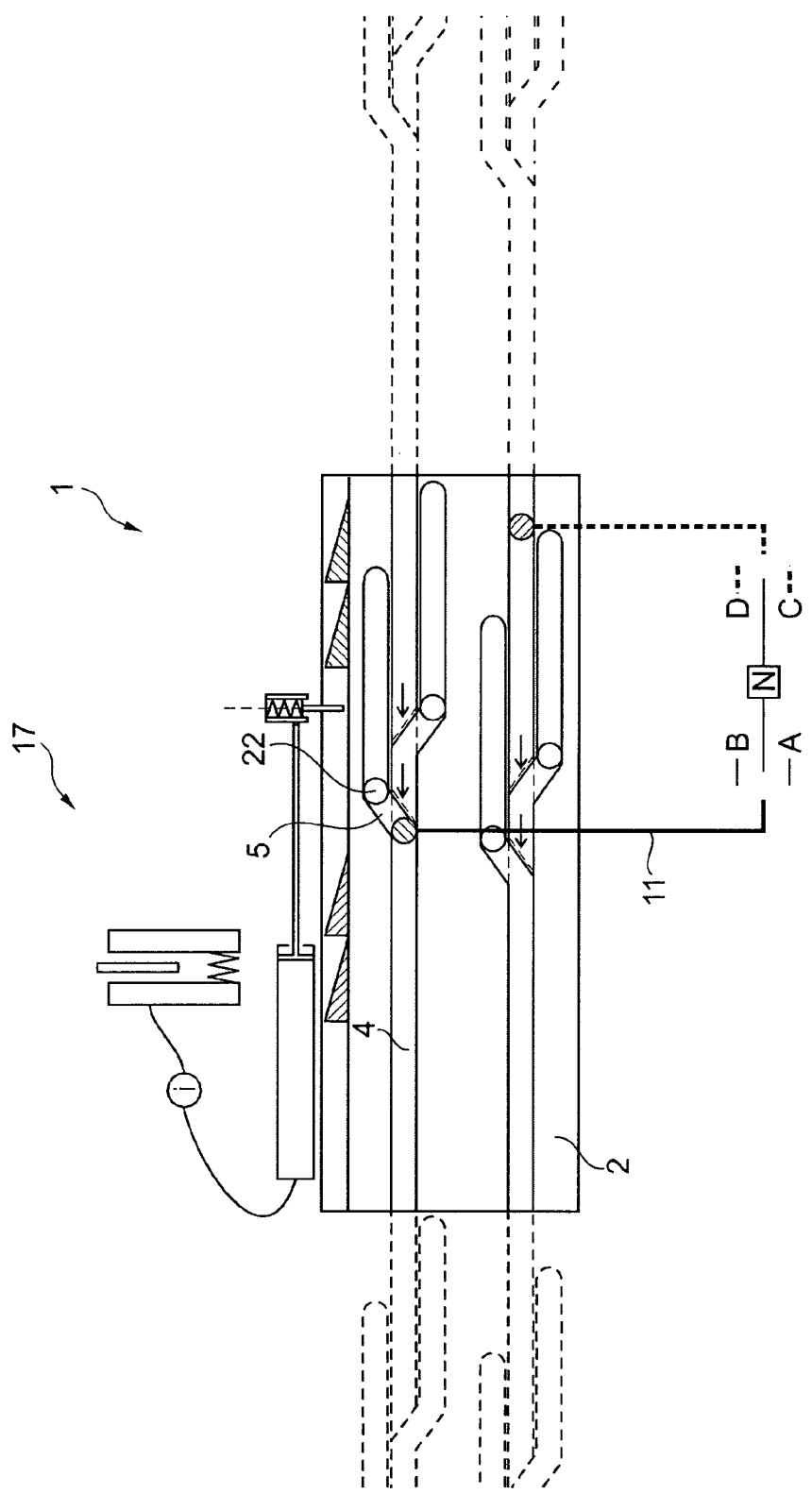
FIG. 10 is a diagrammatic representation of an example embodiment of an actuating device in a further selected operating position.
Figure 11:
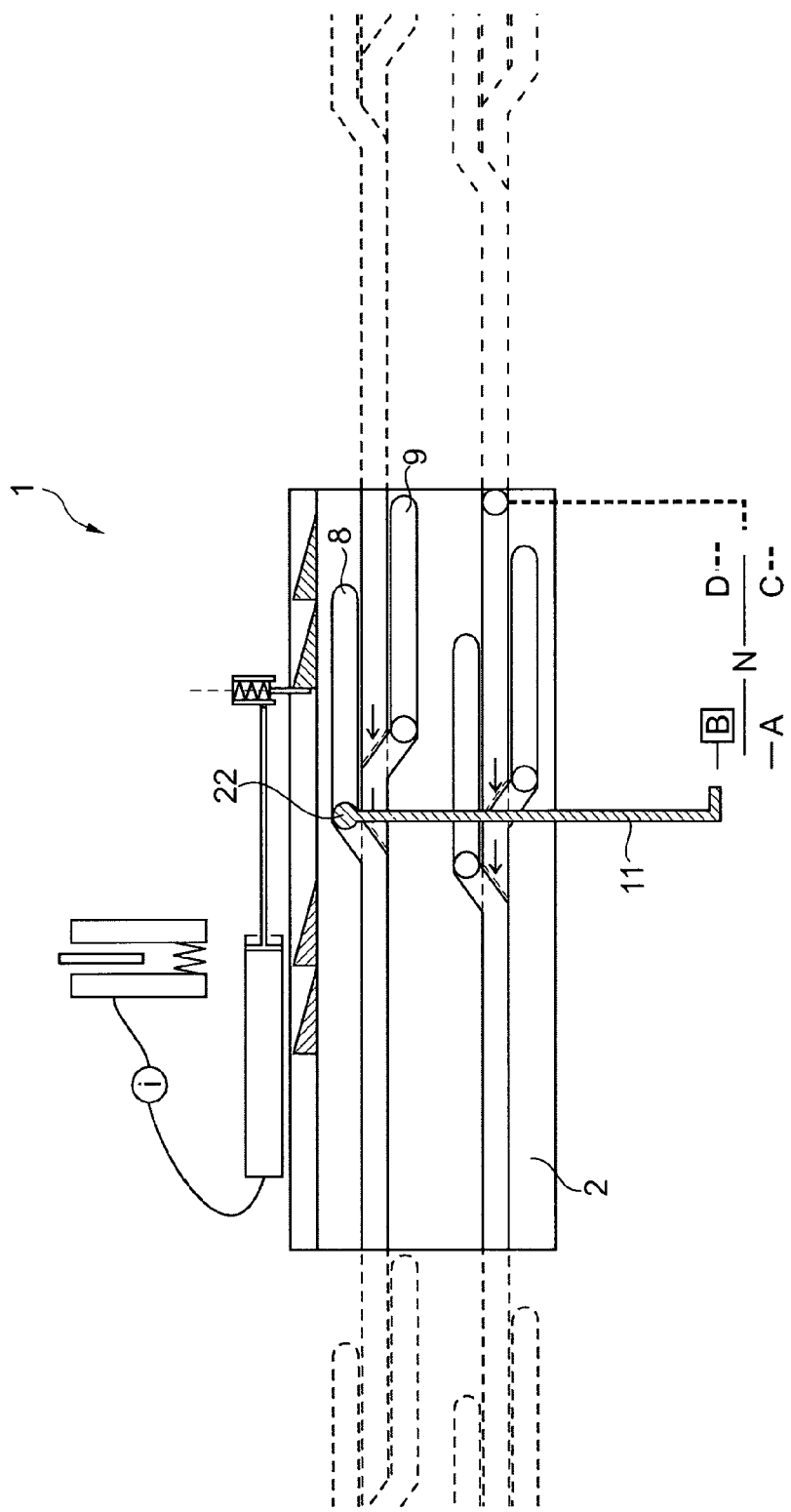
FIG. 11 is a diagrammatic representation of an example embodiment of an actuating device in a further selected operating position.
Figure 12:
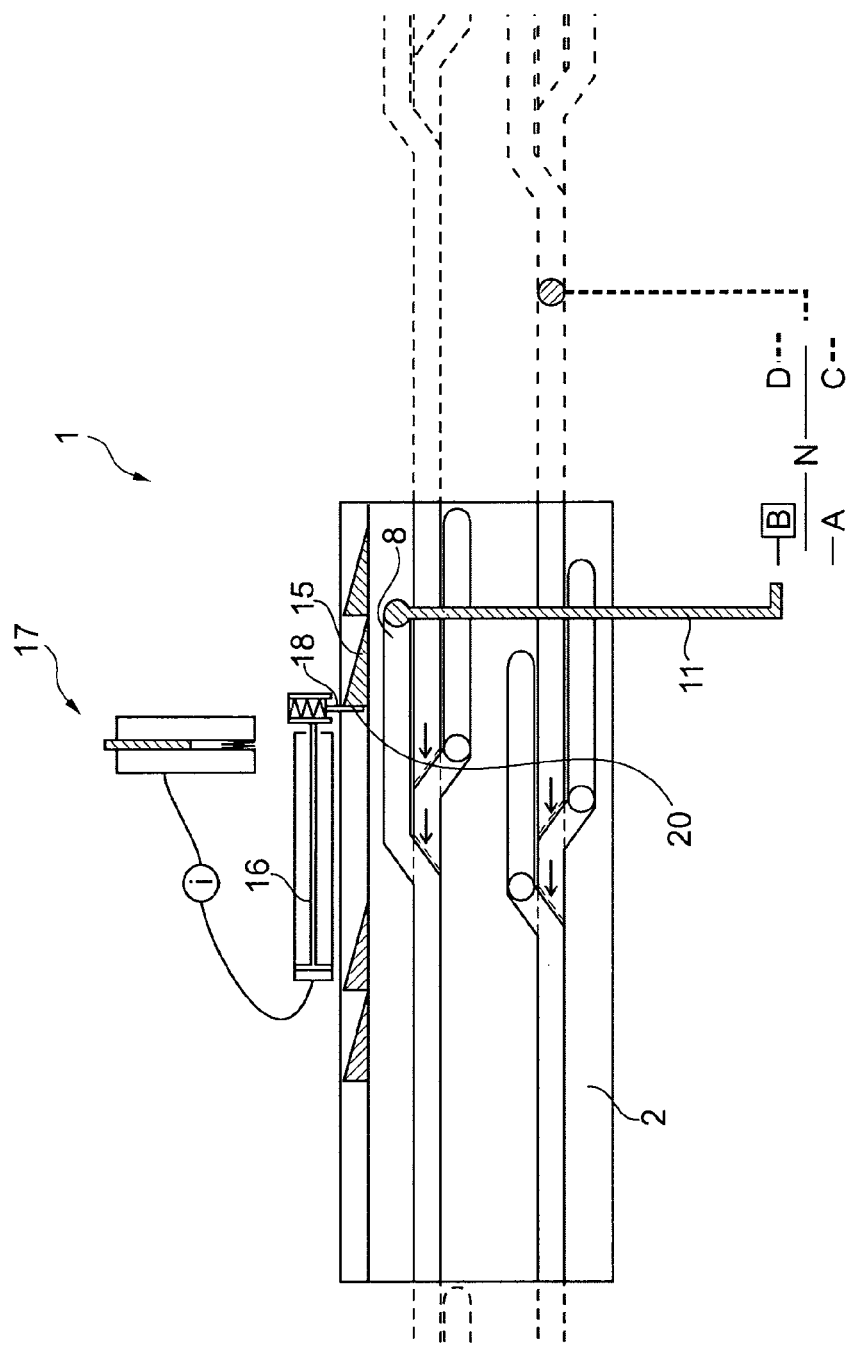
FIG. 12 is a diagrammatic representation of an example embodiment of an actuating device in a further selected operating position.

Rotary cylinder element 2 further comprises ramp regions 15 that act as actuating regions for clutch actuating means 16 that actuate clutch 17. As depicted in FIGS. 10 through 12, clutch 17 can be embodied as a friction clutch. Axially displaceable pin 18 is provided for displacement relative to energy storage element 19 that is supported in an axial direction on an oblique ramp surface of ramp region 15. In an alternative embodiment, energy storage element 19 may be supported in the radial or circumferential directions instead of in the axial direction.

Rotation of cylinder element 2 allows pin 18 to come to rest against flank 20 of ramp region 15, causing flank 20 upon a continued rotation to rotate pin 18 in the circumferential direction and thus causing clutch actuating means 16 to be displaced. In the exemplary embodiment shown in FIGS. 1 to 12, clutch actuating means 16 is embodied as a piston rod of a master cylinder piston so that clutch 17 is actuated hydraulically by a displacement of clutch actuating means 16.

When cylinder element 2 is actuated from the right side towards the left, a selection is made in that contact element 10 or 11 is moved from guide track 3 or 4 to one of guide tracks 6, 7, 8, 9. When cylinder element 2 is rotated in the opposite direction, a shifting process or a clutch actuation process may be carried out.

In FIGS. 1 to 12, dashed lines to the right and to the left of the rectangular region diagrammatically indicating cylinder element 2 indicate guide tracks. These dashed lines represent a continuation of the tracks in the direction of rotation for a better understanding of how the cylinder element works.

Figure 2:
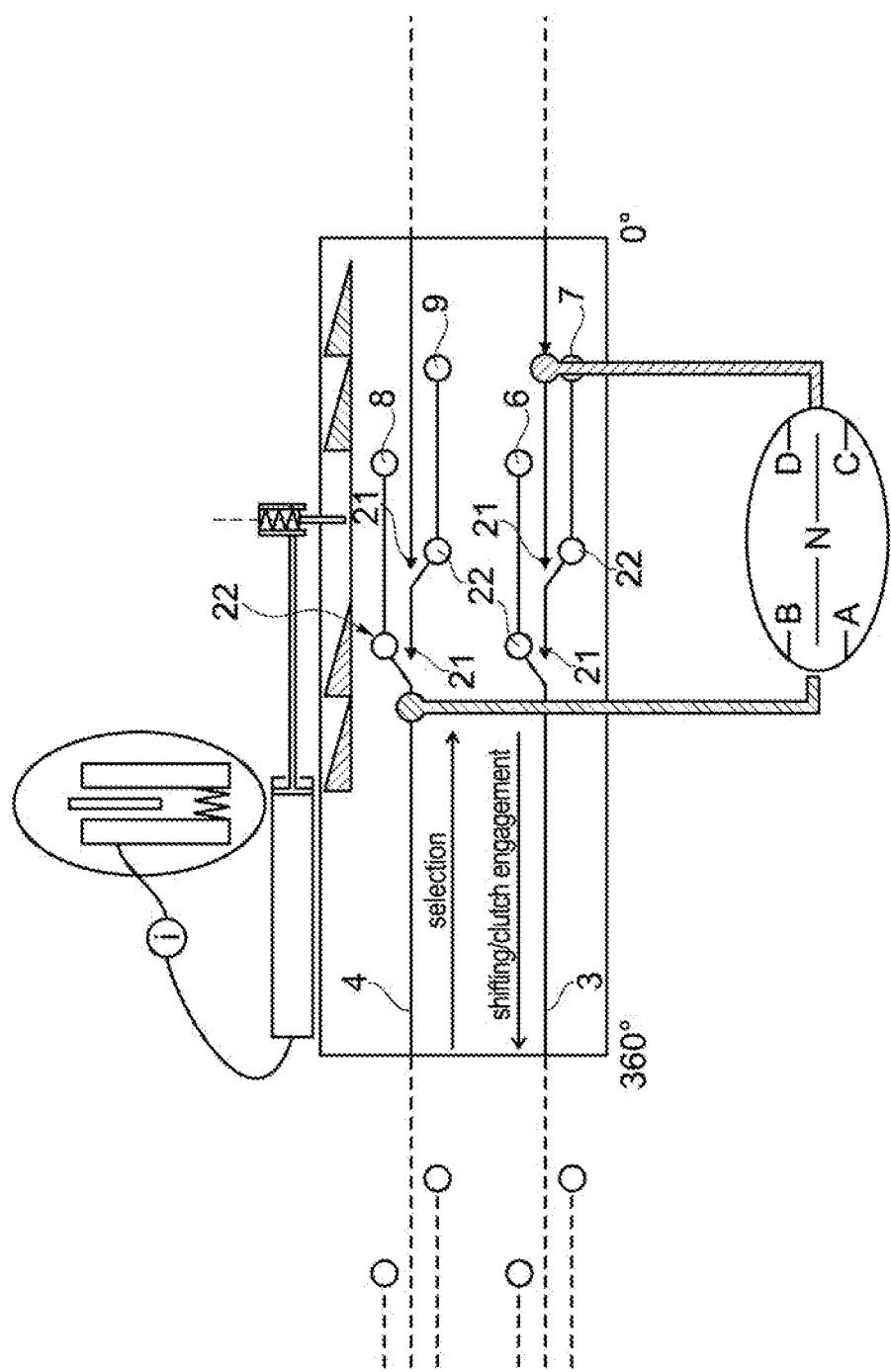
FIG. 2 is a diagrammatic representation of an example embodiment of an actuating device in a further selected operating position.

FIG. 2 is a diagrammatic representation of the arrangement of FIG. 1 with transitions of guide tracks 3, 4, 6, 7, 8, 9 in the passable direction indicated by arrows 21. Circles 22 indicate the shifting points that mark the position at which transmission ratios A, B, C, D are to be considered as engaged when a transition is made from guide track 3, 4 to one of guide tracks 8, 9, 6, 7.

The arrows indicate the transitions from one guide track to another guide track in the passing direction especially for the one-way transitions.

Figure 3:
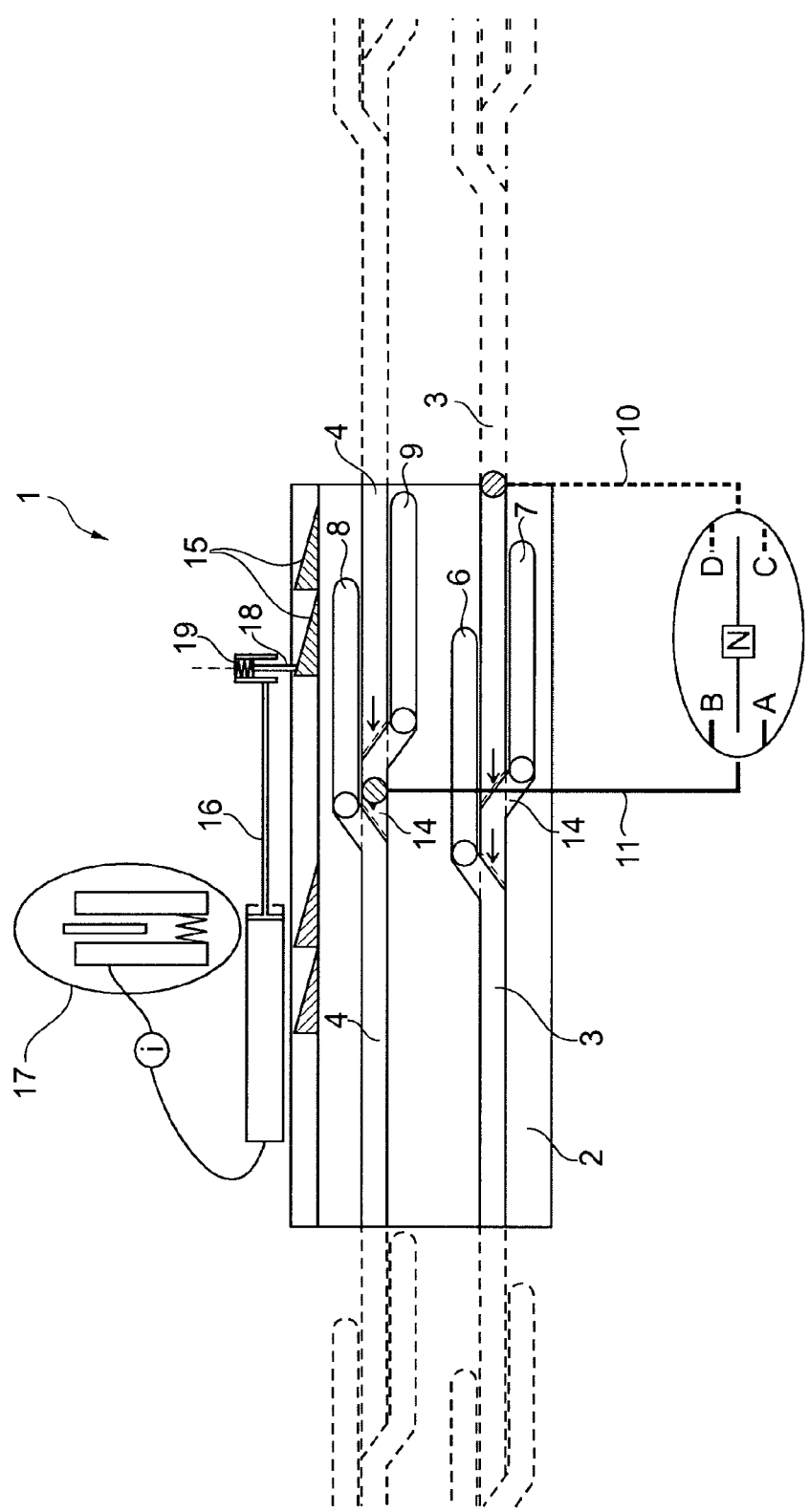
FIG. 3 is a diagrammatic representation of an example embodiment of an actuating device in a further selected operating position.

FIG. 3 illustrates the position of cylinder element 2 of actuating device 1 of the transmission in the neutral setting N prior to an engagement of the shifting position of transmission ratio A. Shifting element 11 is disposed in guide track 14 between guide tracks 8 and 9 as viewed in the axial direction and shifting element 10 is disposed in guide track 3.

Clutch actuating means 18 are set by pin 18 to be in a position in which clutch 17 is not actuated, i.e. in the disengaged position of the clutch. Energy storage element 19 acts on pin 18 to cause pin 18 to rest on a ramp surface of ramp region 15.

Figure 4:
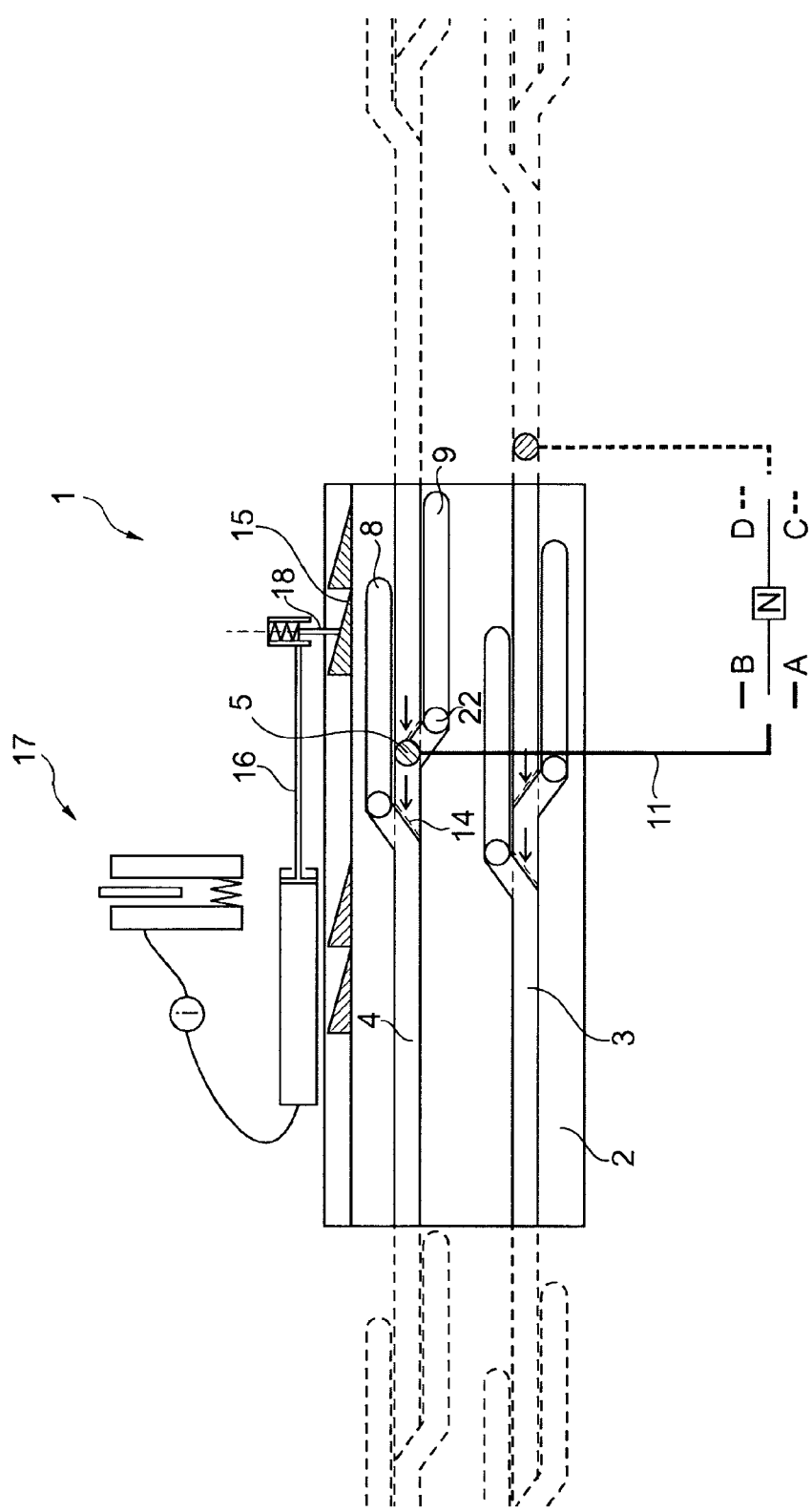
FIG. 4 is a diagrammatic representation of an example embodiment of an actuating device in a further selected operating position.

FIG. 4 illustrates a position of cylinder element 2 of actuating device 4 in a position offset to the left relative to the position shown in FIG. 3. Here, contact element 11 has moved from guide track 14 to junction 5 and, upon continued displacement of the cylinder element to the left, would be moved in an axial direction towards shifting point 22. In FIG. 4, transmission ratio A has been selected and the clutch is disengaged, i.e. open, as pin 18 continues to be supported on a ramp surface of ramp region 15.

Figure 5:
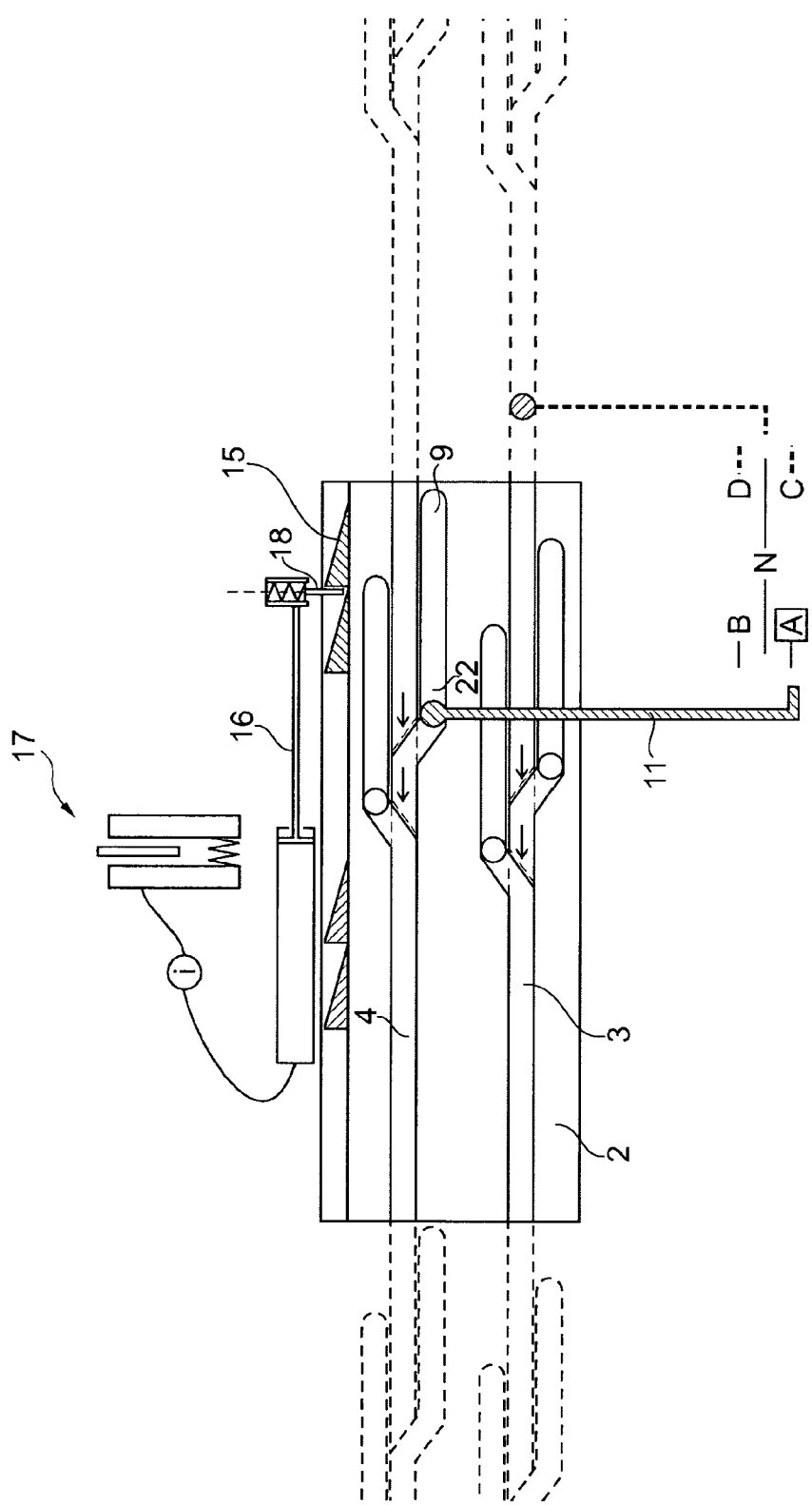
FIG. 5 is a diagrammatic representation of an example embodiment of an actuating device in a further selected operating position.

FIG. 5 illustrates an actuating position of cylinder element 2 in which cylinder element 2 has been moved even further to the left relative to the actuating position of cylinder element 2 in FIG. 4, with contact element 11 located in shifting point 22 and transmission ratio A engaged. The clutch remains unactuated, i.e. disengaged, as pin 18 continues to rest against a ramp surface of ramp region 15 and clutch actuating means 16 continues to be unactuated.

Figure 6:
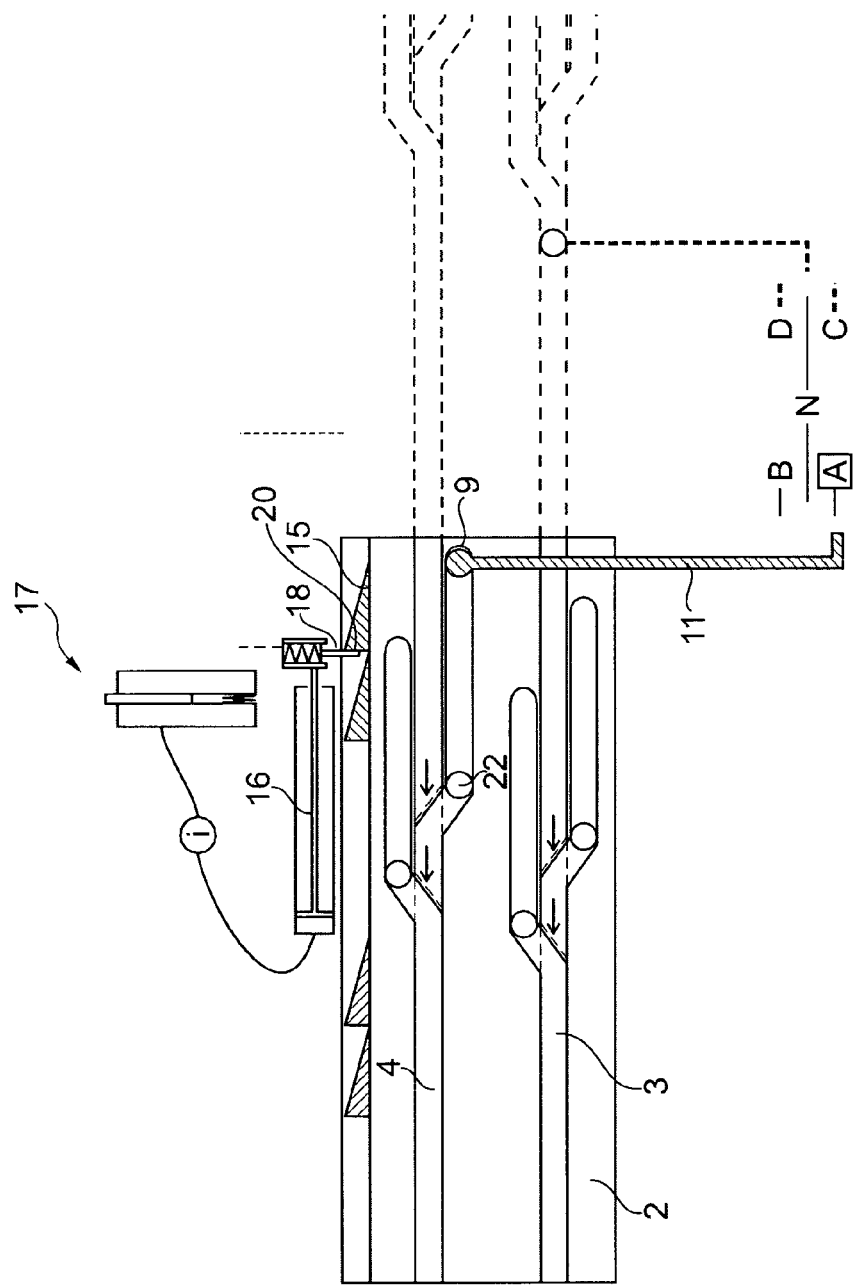
FIG. 6 is a diagrammatic representation of an example embodiment of an actuating device in a further selected operating position.

Compared to FIG. 5, FIG. 6 illustrates a further actuating position in which cylinder element 2 has been moved even further to the left, causing contact element 11 to have moved further along guide track 9 past shifting point 22, causing the vertical flank of ramp region 15 to act on pin 18 in the circumferential direction to displace clutch actuating means 16 and in turn to engage clutch 17 as a result of a hydraulic action, for instance. Consequently, FIG. 6 illustrates a condition in which transmission ratio A is engaged and the clutch is closed, i.e., engaged.

Figure 7:
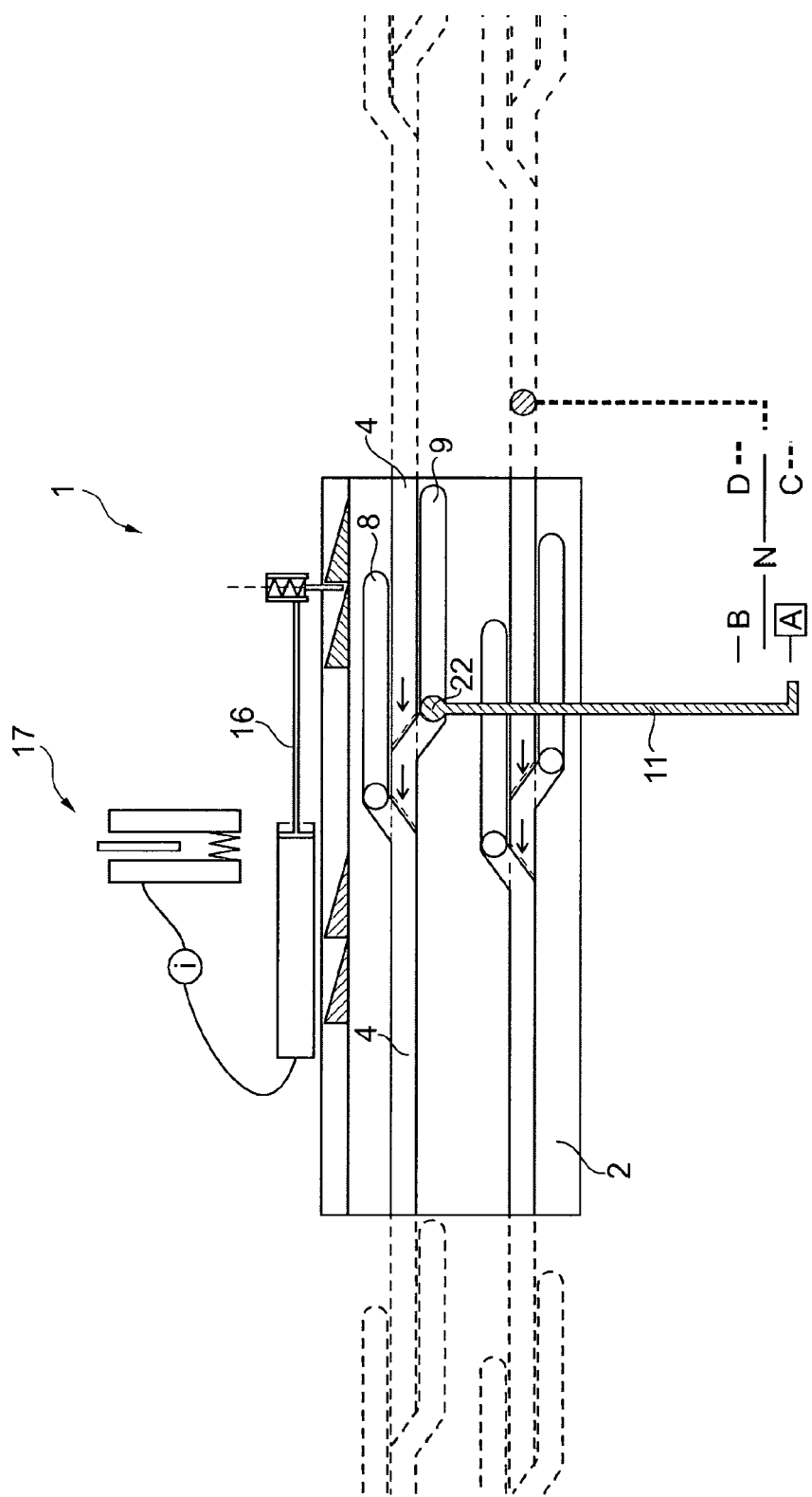
FIG. 7 is a diagrammatic representation of an example embodiment of an actuating device in a further selected operating position.

Compared to FIG. 6, FIG. 7 illustrates an operating position of cylinder element 2 in which cylinder element 2 has been moved to the right relative to the position shown in FIG. 6, causing contact element 11 to have moved from the end of guide track 9 to shifting point 22. Clutch actuating means 16 is unactuated again and clutch 17 is disengaged, i.e. open. In the operating condition shown in FIG. 7, transmission ratio A is engaged while the clutch is disengaged.

Figure 8:
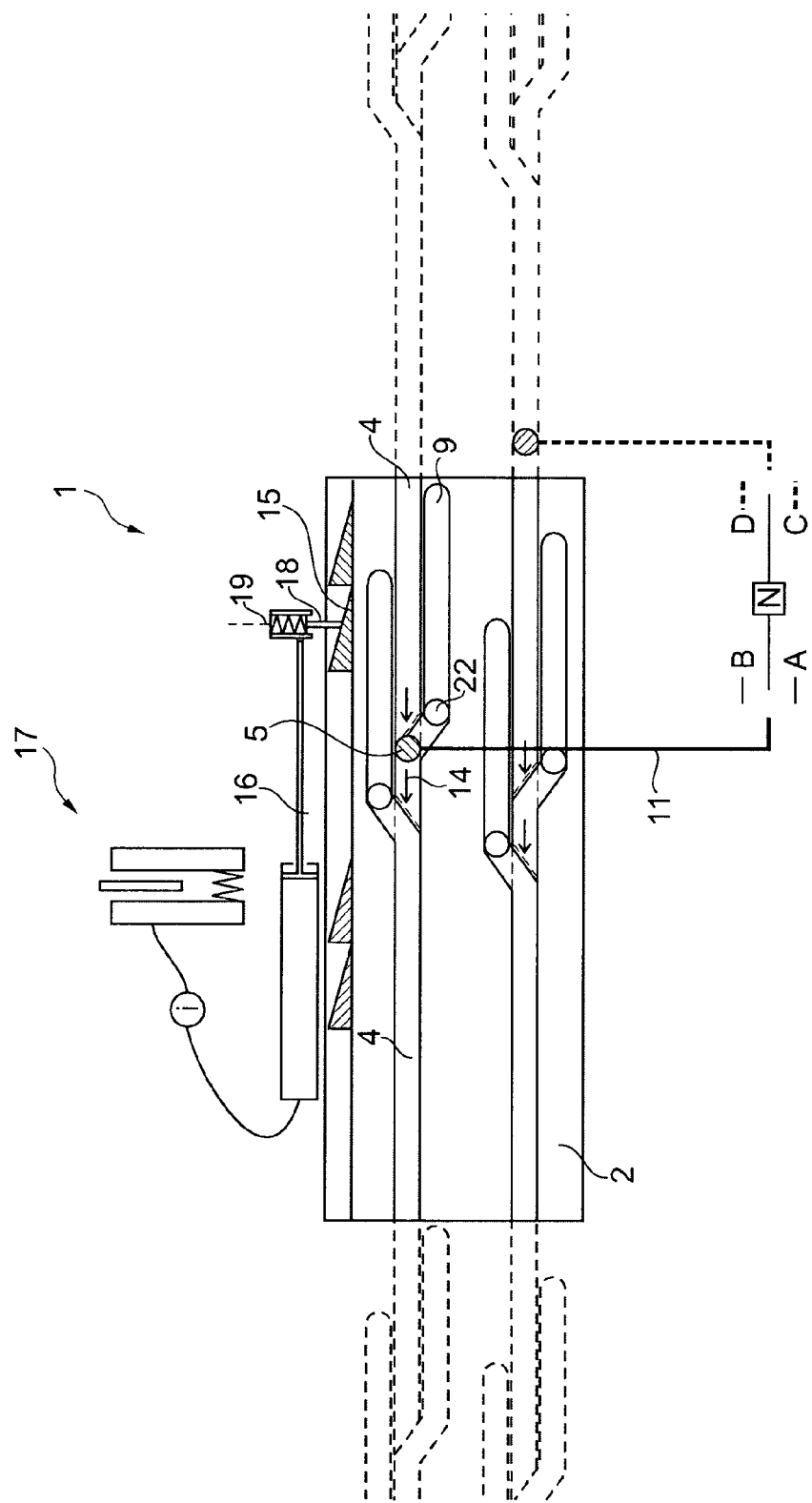
FIG. 8 is a diagrammatic representation of an example embodiment of an actuating device in a further selected operating position.

FIG. 8 illustrates an operating position in which cylinder element 2 has been moved further to the right compared to the position shown in FIG. 7. Thus, contact element 11 has been moved to junction 5 and from the level of guide track 9 to the level of guide track 4 in the axial direction, transmission ratio A is disengaged and neutral position N is engaged while the clutch is disengaged. At the same time, pin 18 moves along the ramp surface of ramp region 15 against the force of energy storage element 19, clutch actuating means 16 is unactuated and clutch 17 is disengaged.

Figure 9:
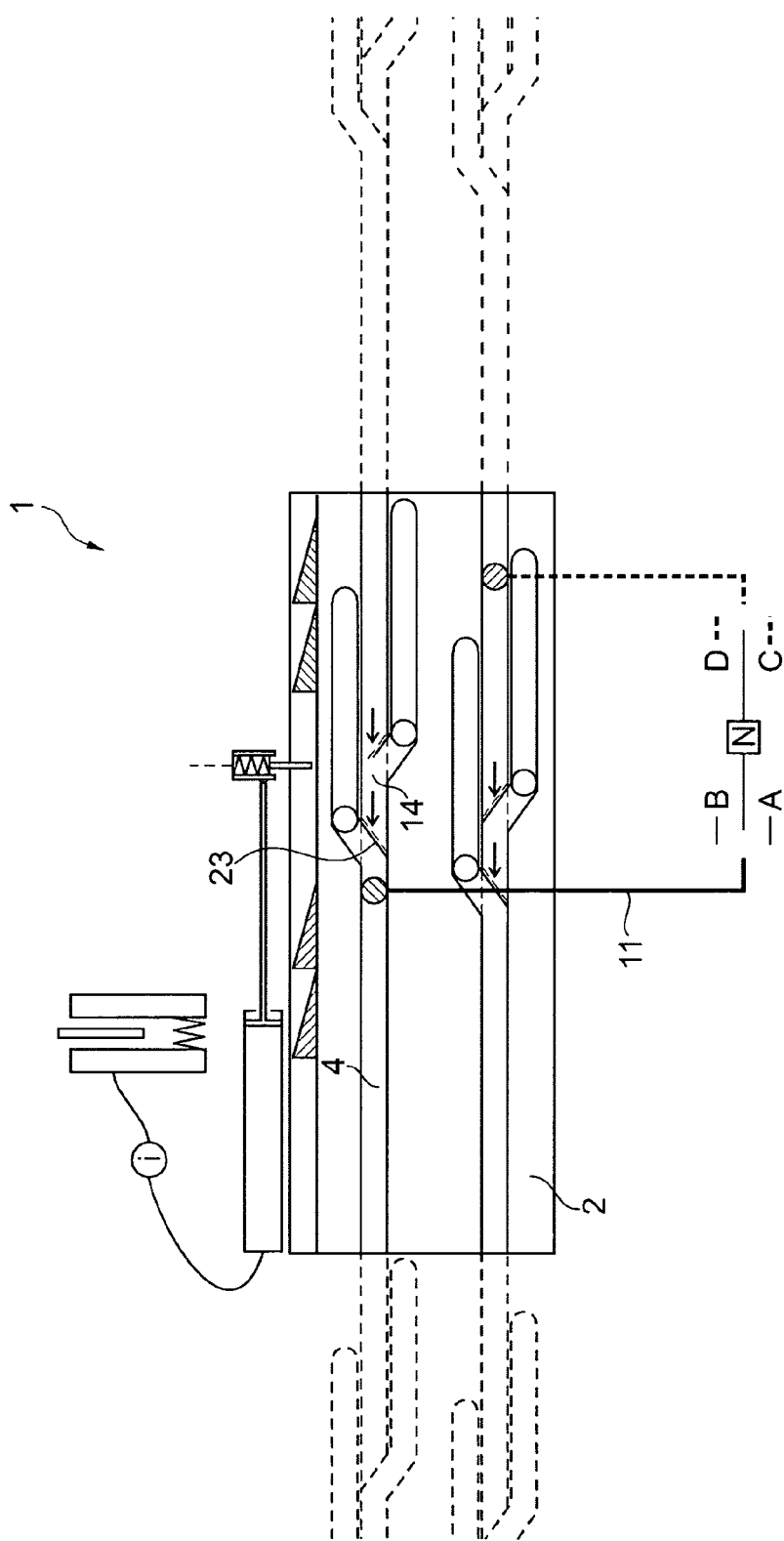
FIG. 9 is a diagrammatic representation of an example embodiment of an actuating device in a further selected operating position.

FIG. 9 illustrates an operating position of cylinder element 2 in which cylinder element 2 has been moved further to the right compared to the operating position shown in FIG. 8. Thus, contact element 11 transitions from guide track 14 to guide track 4, passing through a one-way junction region 23 from the right to the left.

FIG. 10 illustrates an operating position of cylinder element 2 in which cylinder element 2 has been moved further to the left compared to the operating position of FIG. 9, causing contact element 11 to have moved to the right in guide track 4 towards junction 5 towards shifting point 22. In the operating position of FIG. 10, transmission ratio B has been selected and clutch 17 is disengaged.

FIG. 11 illustrates an operating position of cylinder element 2 in which cylinder element 2 has been moved further to the left compared to the position of cylinder element 2 in FIG. 10, causing contact element 11 to have moved from guide track 4 to shifting point 22 of guide track 8. In this operating position, transmission ratio B is engaged and the clutch is disengaged.

FIG. 12 illustrates an operating position of cylinder element 2 in which cylinder element 2 has been moved further to the left compared to the operating position shown in FIG. 11, causing contact element 11 to have moved further to the right in guide track 8. At the same time, clutch 17 has been engaged because clutch actuating element 16 has been actuated by pin 18 and flank 20 of ramp region 15. In the exemplary embodiment of FIG. 12, transmission ratio B is active and the clutch is engaged.

The same operations that have been described above to actuate contact element 11 may be carried out for contact element 10 to select transmission ratios C and D by moving contact element 10 to guide tracks 6 and 7.

Figure 13:
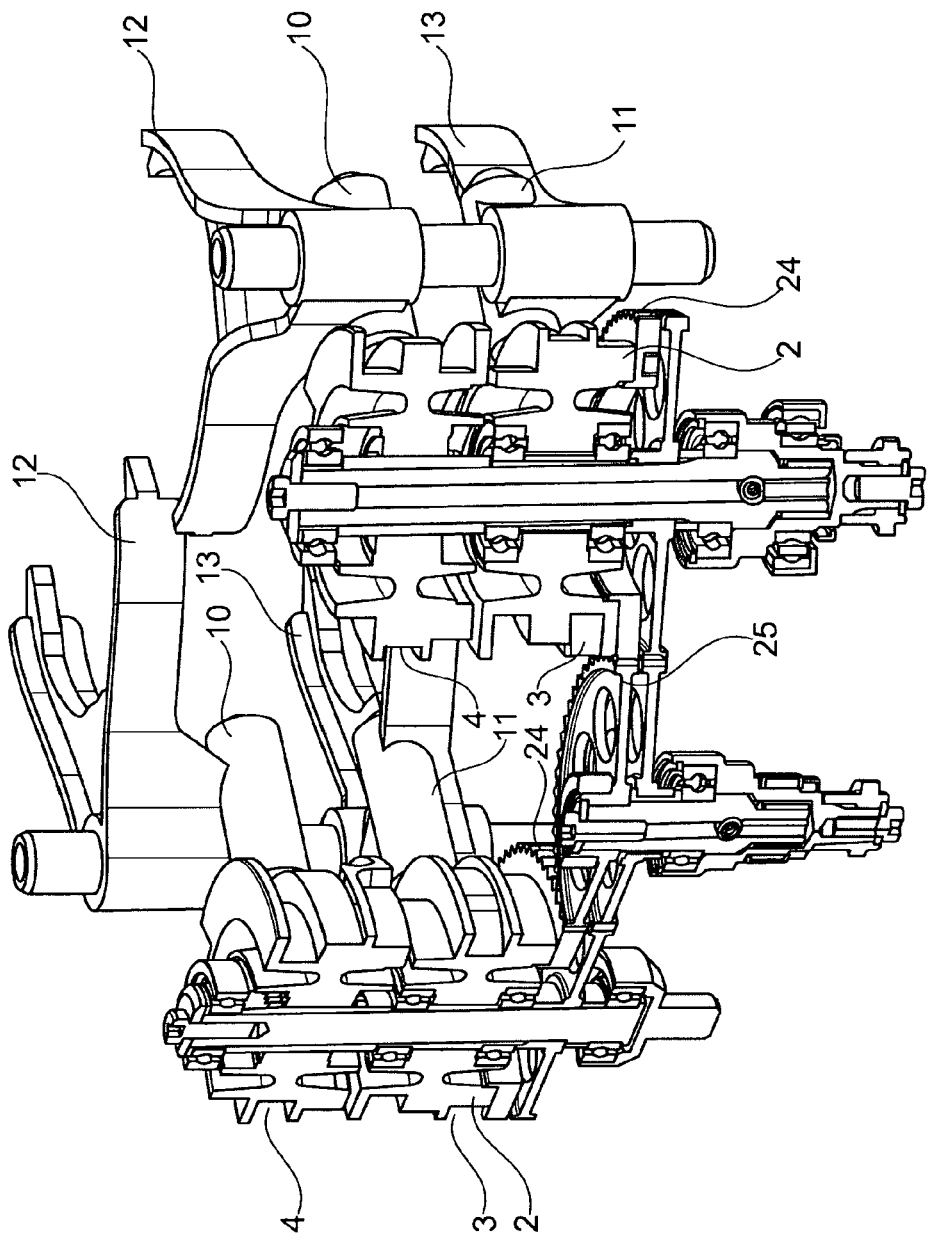
FIG. 13 is a view of a section of a transmission of the invention.

FIG. 13 is a sectional view of the arrangement of two cylinder elements 2 and gearwheel 24 to be driven by driving stage 25. Contact elements 10, 11 of shift forks 12, 13 engage in guide tracks 3, 4 and are displaceable into guide tracks 6, 7, 8, 9, 14 by a rotation of cylinder elements 2.

FIG. 14 illustrates two cylinder elements 2 with respective guide track 3, 4 in which contact elements 10, 11 connected to shift forks 12, 13 are engaged. Spring-loaded pin 26 is provided to be actable upon against the guide track counter to the pre-loading action of an energy storage element 27.

Figure 15:
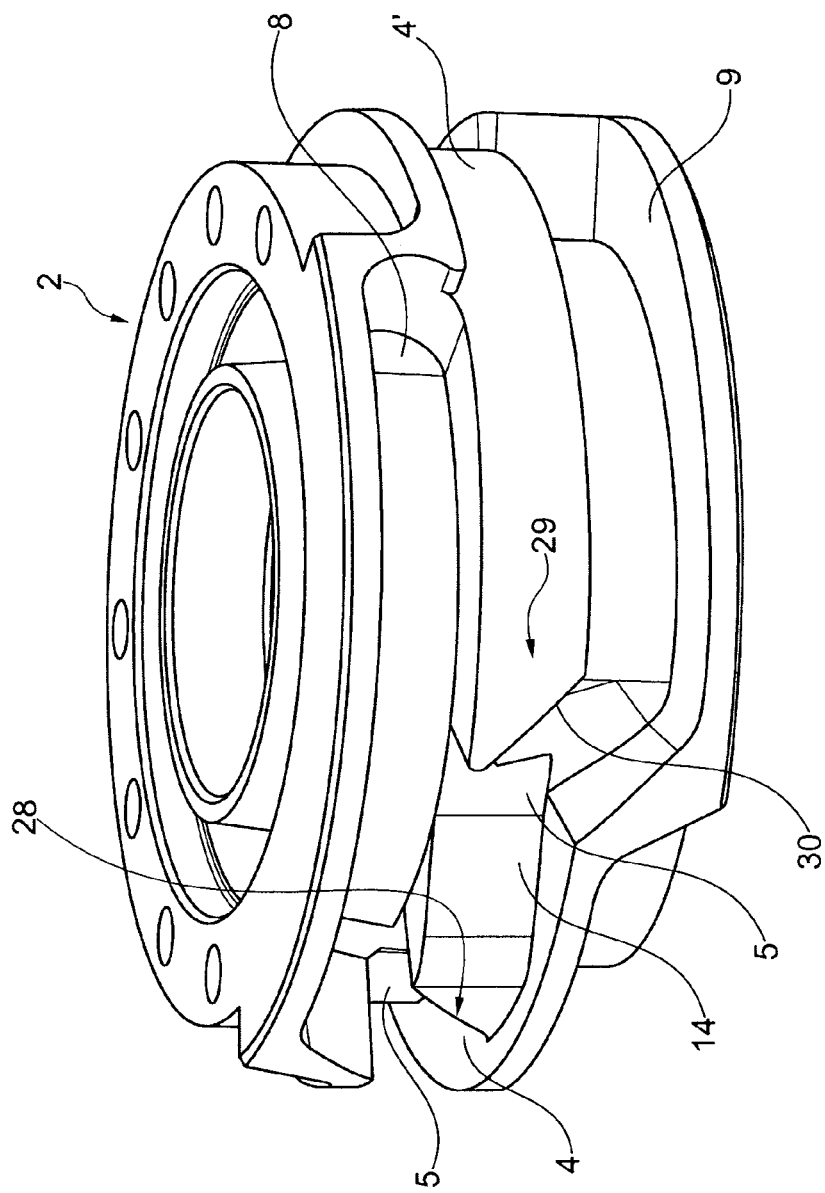
FIG. 15 is a view of a section of a transmission of the invention.

FIG. 15 illustrates cylinder element 2 with guide track 4 embodied as a groove. In the transitional region of junction 5, a ramp-shaped protrusion is provided as a deflection to guide track 8, which is embodied as a groove that is axially spaced apart. In the same way, a ramp-shaped transitional region 5 is provided as a deflection in the axial direction from guide track 14 to guide track 9, which is axially spaced apart. Transition from guide track 4 to guide track 8 may thus only occur along junction region 5 by deflection on ramp 28. Transition from guide track 4' to guide track 14 along arrow 29 is possible. Transition from guide track 14 to guide track 9 in turn only occurs along ramp 30.

Figure 16:
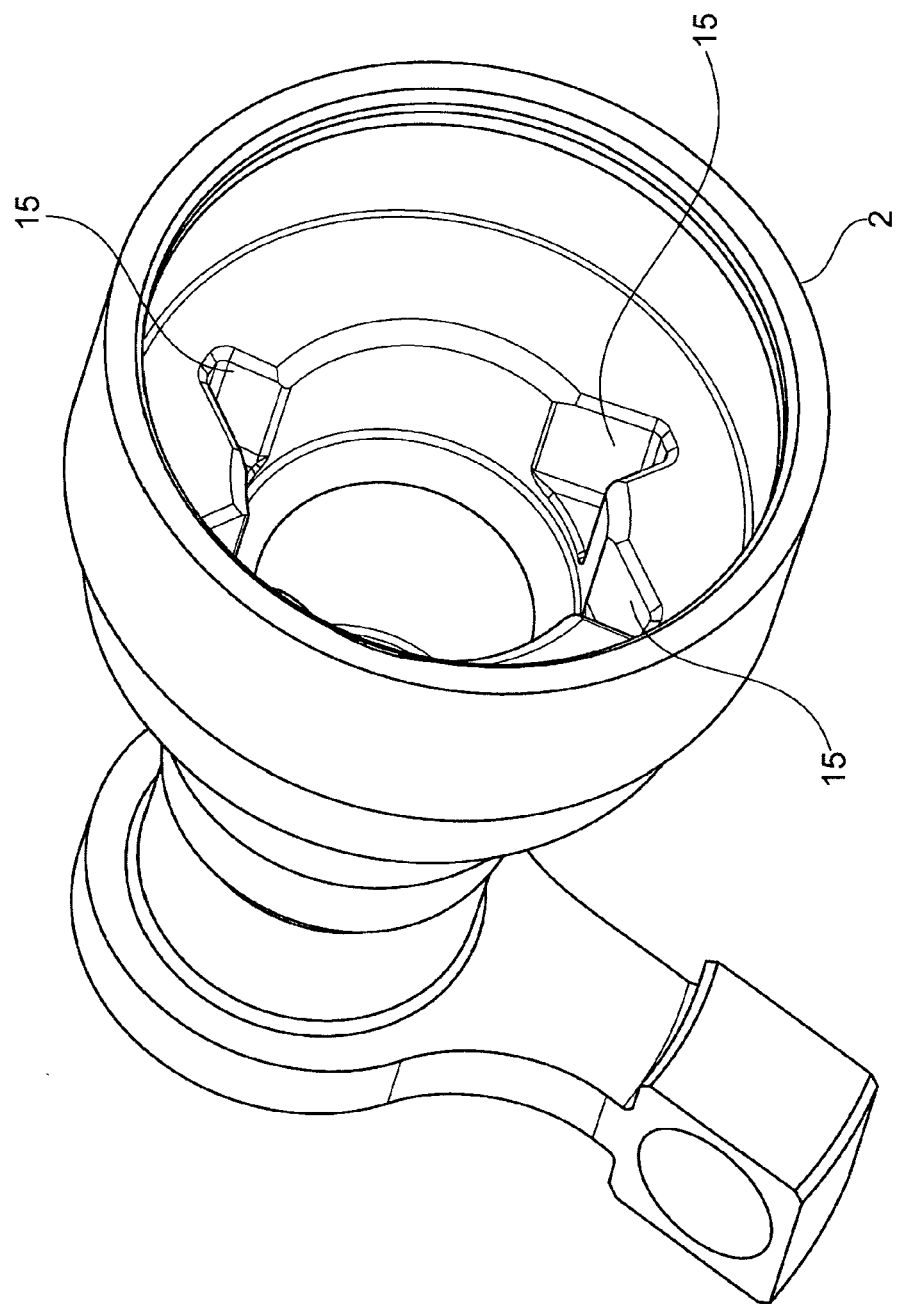
FIG. 16 is a view of a section of a transmission of the invention.
Figure 17:
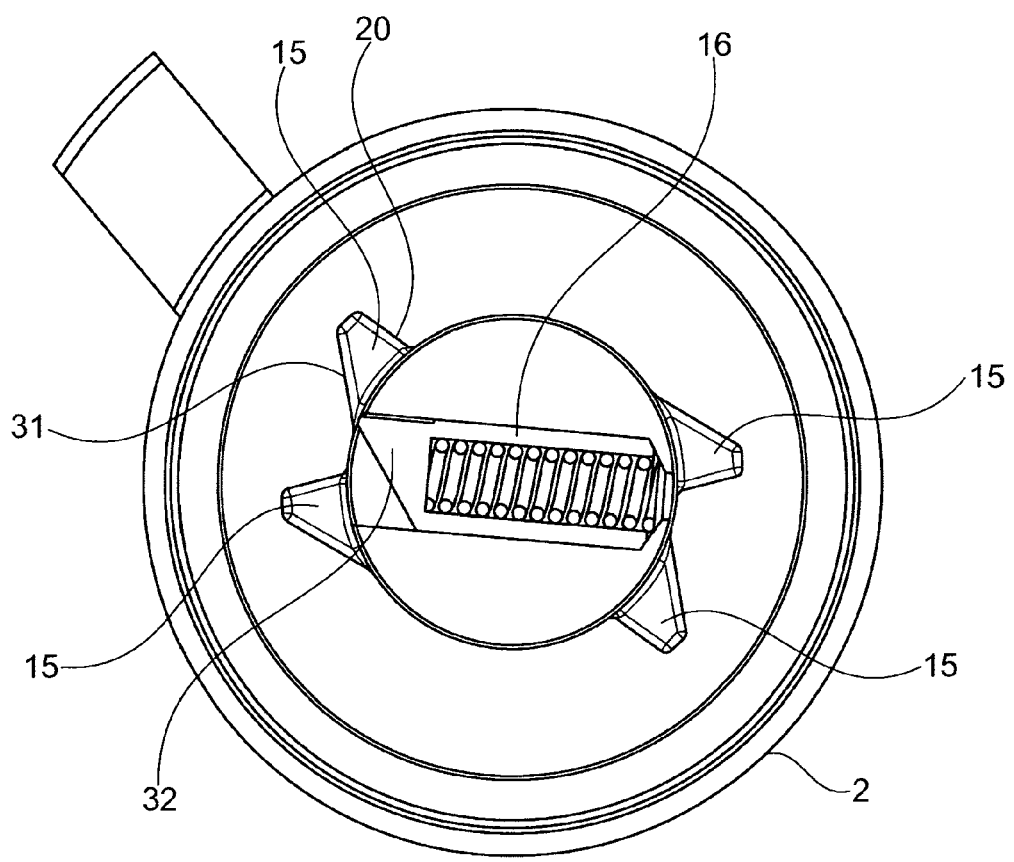
FIG. 17 is a view of a section of a transmission of the invention.

FIGS. 16 and 17 illustrate cylinder element 2 embodied as a hollow element with ramp regions 15 formed on a radially inner surface. Ramp regions 15 have ramp surface 31 and flank 20. Clutch actuating means 16 has engagement region 32 that is likewise of ramp-shaped design. Thus, clutch actuating means 16 may be rotated in a counter-clockwise direction relative to cylinder element 2 because, in this case, engagement region 32 may be rotated along ramp surface 31. In the case of a rotation in a clockwise direction, engagement region 32 hits flank 20 and any further relative rotation between clutch actuating means 16 and cylinder element 2 is blocked. In this operating condition, rotation of clutch actuating means 16 is only possible together with cylinder element 2.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

1 Actuating device
2 Cylinder element
3 Guide track
4, 4' Guide track
5 Junction
6 Guide track
7 Guide track
8 Guide track
9 Guide track
10 Contact element
11 Contact element
12 Shift fork
13 Shift fork
14 Guide track
15 Ramp region
16 Clutch actuating means
17 Clutch
18 Pin
19 Energy storage device
20 Flank
21 Arrow
22 Shifting points
23 Junction region
24 Gearwheel
25 Driving stage
26 Pin
27 Spring
28 Ramp
29 Arrow
30 Ramp
31 Ramp surface
32 Engagement region

What is claimed is:

1. A system, comprising:
   a friction clutch; and,
   an actuating device for actuating a transmission to select a transmission ratio and to engage or disengage the selected transmission ratio and to actuate the friction clutch, the actuating device, comprising:
   at least one rotary cylinder element;
   guide tracks formed in the at least one rotary cylinder element;
   shift forks, each with a contact element engaging in the respective guide tracks to displace the shift forks in order to select and engage or disengage the transmission ratio of the transmission; and,
   an actuating region for a clutch actuating means for actuating the friction clutch.

2. The actuating device recited in claim 1, wherein the at least one cylinder element is rotatable in a first direction of rotation and in a second direction of rotation counter to the first direction of rotation.

3. The actuating device recited in claim 1, wherein the guide tracks of the at least one cylinder element are arranged on an outer circumference of the cylinder element.

4. The actuating device recited in claim 1, wherein the at least one cylinder element is hollow and the actuating region is formed on an inner circumference of the at least one cylinder element.

5. The actuating device recited in claim 1, wherein the guide tracks have junctions and the junctions are passed through as a function of a direction of rotation.

6. The actuating device recited claim 5, wherein upon the passing of a junction in a first direction of rotation, a change is made from one guide track to another guide track.

7. The actuating device recited in claim 5, wherein upon the passing of a junction in a second direction of rotation, no change is made from one guide track to another.

8. The actuating device recited in claim 1, wherein the actuating region has ramp regions arranged to lock the clutch actuating means against the ramp region and to entrain it in the rotation upon a rotation of the actuating region in a first direction of rotation and to rotate the clutch actuating means relative to the ramp region and not to entrain it in the rotation upon a rotation of the actuating region in a second direction of rotation.

9. A transmission with a plurality of transmission ratios and at least one clutch, comprising at least one actuating device as recited in claim 1.

10. The transmission recited in claim 9, wherein two actuating devices are provided to select a transmission ratio and to engage or disengage the selected transmission ratio and to actuate two clutches.

11. The transmission recited in claim 9, wherein the transmission is a double clutch transmission.

12. An actuating device for actuating a transmission to select a transmission ratio and to engage or disengage the selected transmission ratio and to actuate at least one clutch, comprising:
   at least one rotary cylinder element;

guide tracks formed in the at least one rotary cylinder element;
a shift fork with a contact element engaging in the respective guide tracks to displace the shift fork in order to select and engage or disengage the transmission ratio of the transmission; and,
an actuating region for a clutch actuating means for actuating the at least one clutch;
wherein the at least one cylinder element is hollow and the actuating region is formed on an inner circumference of the at least one cylinder element.

* * * * *